Dec. 9, 1941.  L. C. ROTTER ET AL  2,265,655
FITTING
Filed Dec. 9, 1939  2 Sheets-Sheet 1

Ludwig C. Rotter,
Victor G. Klein,
Inventors
Haynes, Koenig and Wolf,
Attorneys

Dec. 9, 1941.  L. C. ROTTER ET AL  2,265,655
FITTING
Filed Dec. 9, 1939  2 Sheets-Sheet 2
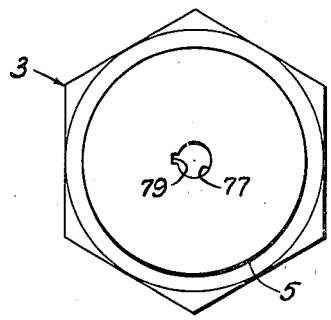
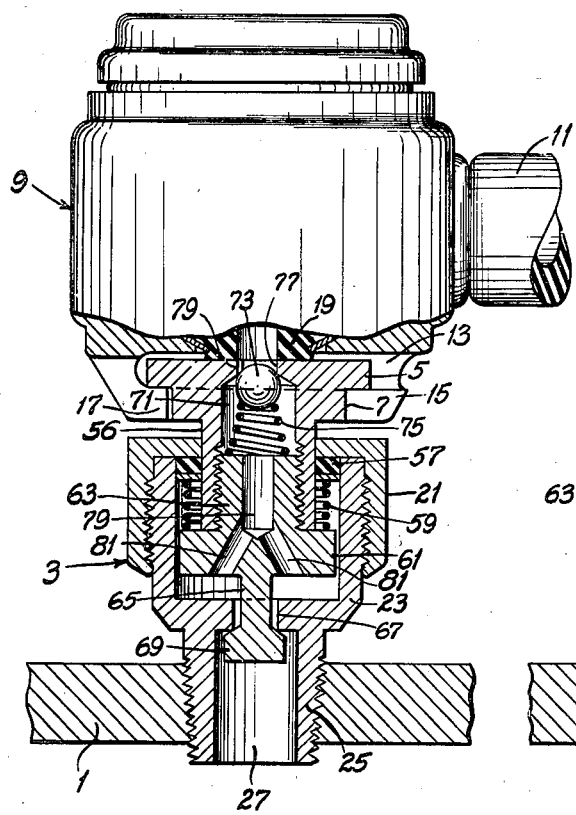
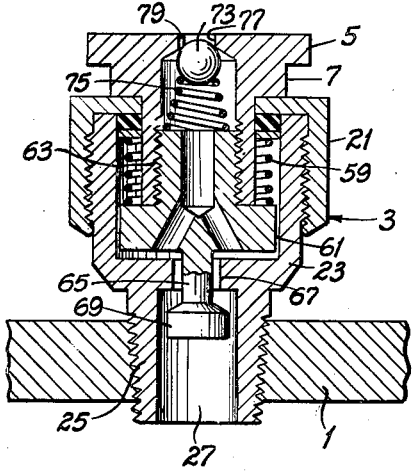

Patented Dec. 9, 1941

2,265,655

UNITED STATES PATENT OFFICE 2,265,655

FITTING

Lutwin C. Rotter, Maplewood, and Victor G. Klein, St. Louis, Mo., assignors to Lincoln Engineering Company, St. Louis, Mo., a corporation of Missouri Application December 9, 1939, Serial No. 308,400

9 Claims. (Cl. 184—105)

This invention relates to fittings, and with regard to certain more specific features, to lubricant-receiving fittings.

Among the several objects of the invention may be noted the provision of a lubricant-receiving fitting which is adapted to limit both the amount, and pressure, of a charge of lubricant from a high-pressure source, so as to prevent either overcharging, or blowing out of any seal associated with the compartment which the fitting serves; the provision of a device of the class described which is dependable and positively operable with little or no special instructions for its use; and the provision of a device of the class described which is operative with the usual couplers and pumps now available for the purpose of application of lubricant under pressure. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated two of various possible embodiments of the invention, Fig. 1 is a vertical section showing one form of the invention in an open position, the parts of an attached coupler being shown mostly in side elevation;

Fig. 4 is a view similar to Fig. 1 showing another embodiment of the invention;

Fig. 5 is a view similar to Fig. 4 but showing fitting parts only in an alternate position; and, Fig. 6 is a plan view of Fig. 5.

Similar reference characters indicate corresponding parts throughout the several views of the drawings.

Many lubricant-containing compartments for bearings and the like are provided with accurately fitted, packed, running seals. In order that such seals shall maintain their efficiencies, and not be blown out, they should not be subjected to the high internal pressure which may be engendered by applying lubricant to the compartment with ordinary high-pressure grease pumps. The present invention permits the proper low-pressure lubrication of sealed bearing compartments by means of high-pressure lubricating apparatus, without blowing out the seals under the potentially high pressures available.

Figure 3:
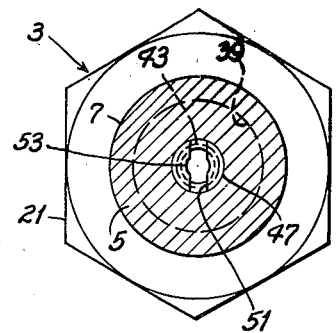
Fig. 3 is a horizontal section taken on line 3—3 of Fig. 2.
Figure 1:
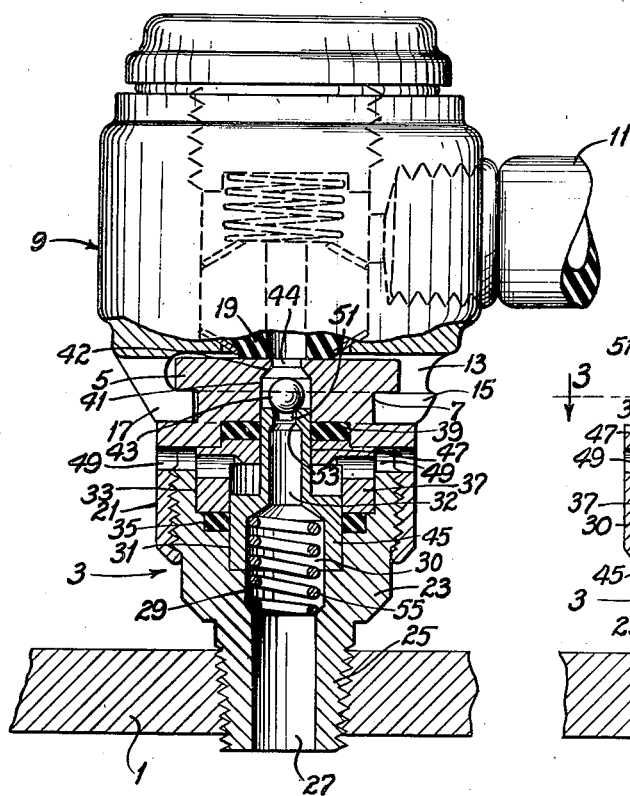

Referring now more particularly to Fig. 1, there is shown at numeral 1 a wall which represents a portion of any closed lubricant-receiving compartment of the type above-referred to, that is, one in which there are running parts with running seals between the interior and the exterior which should not be blown out. It will be understood that the invention is applicable to many other types of compartments which receive fluid and which should be protected against the potentially high pressures available in the supply pump.

At numeral 3 is shown in general a so-called button fitting, improved as hereinafter described. The name "button fitting" arises from the fact that such fittings have a button-like head 5 provided with a groove 7 for cooperative engagement with a coupler which is shown generally at numeral 9. Other cooperative engaging means may be used, such as pressure contact heads or the like.

The coupler 9 is on the outlet end of a flexible conduit 11 which is supplied with lubricant under high pressure from a suitable grease pump. For purposes of illustration it will be assumed that there is a grease pump at the other end of the line 11 which is manually operated by means of an oscillating handle. An automatic pump may of course also be used.

The coupler is provided with grooves 13 for receiving with sliding motion the button head 5. Flanges 15 and a stop 17 cooperate with the groove 7 so that the coupler 9 may be drawn from left to right in Fig. 1 to make the application shown. A suitable spring-pressed packing 19 assures a proper seal between the coupler 9 and the button head 5 when the coupler is attached as shown.

A threaded cap 21 forms an extension from the head 5 and is threaded over a body 23. The lower end of the body 23 is threaded into the lubricant-receiving compartment as shown at numeral 25.

The body 23 is hollow, as indicated at 27, 29, 31 and 33. In the bottom of the counter-bore 33 is a packing 35 which is held by means of an insert 37, the latter interiorly forming a continuation of the bore 31. The insert 37 also holds in place an upper packing 39 which is located at the lower end of a cylinder 41 within the upper end of the cap 21. At the button head 5 the cylinder 41 tapers as at 42 to an inlet 44 to form a seat for a ball check-valve 43.

A differential plunger is provided having a lower large piston part 45 which fits the bore 31 and a small piston part 47 which fits the cylinder 41. The large piston part 45 has a bore 30 which forms a continuation of the bore 29 and which is larger in diameter than the cylinder 41 or piston 47. The area above the large piston part 45 communicates with the atmosphere through the passages 49.

The bore 30 has a small extension 32 through the small piston 47 which at the upper end communicates with the cylinder 41 through a milled slot 51. The ball check-valve 43 does not seal off the slot 51, but when pushed up does seal off the inlet 44 against entry of dirt when the coupler 9 is uncoupled. A spring 55 serves to push up the differential piston 45, 47 and thus to close the valve 43 when internal pressure does not do so.

The members 45, 47 may collectively be referred to as a differential piston operating in a differential cylinder 31, 41.

Operation is as follows:

The head 9 is attached by placing the flanges 15 in the groove 7 and drawing the head from left to right until the stop 17 prevents further movement (see Fig. 1). Then the pump at the end of the line 11 is reciprocated whereupon lubricant under pressure flows from the coupler 9 into the opening 44. The ball check-valve 43 opens and, being carried upon the piston 47, forces down the piston 47, 45, against the action of the return spring 55. High pressure on the top of the small piston part 47 aids the downward movement. The first stroke of the pump will then open the valve and push down the piston 45, 47 and start delivery into the compartment 1. In passing through port 51 the lubricant is throttled from a higher to a lower pressure.

The compartment 1 has air in it besides lubricant, which will become compressed as lubricant enters, thus building up a back pressure which is applied to the under side of the large piston part 45. As the first pump stroke ceases, the back pressure on the under side of the piston part 45 which is distributed over a relatively large area recloses the valve 43. Thus, the valve is reclosed after each pump stroke.

Upon each successive stroke of the pump, a higher pressure is necessary to open the valve 43 than was required on the previous stroke. For example, upon the first stroke, the only pressure to be overcome is that of the spring 55, assuming no plus pressure within the compartment 1. Then, as strokes multiply, a relatively small pressure within the compartment 1 is enough to hold shut the valve 43 against a large pump pressure. Hence, the operator quickly reaches a pressure condition with his pump which prevents him from further pumping before the pressure in the compartment 1 rises too high.

The ratio of the effective pressure-receiving areas below the piston part 45 and above the piston part 47 for balanced pressure conditions may be as desired. For example, 1000 pounds per square inch as against 50 pounds per square inch; or a 20 to 1 ratio may be desired. Therefore, if the maximum pressure to which the operator can operate the pump is 1000 pounds per square inch, his pumping activities will be stopped by a 50 pound pressure in the compartment 1 rather than by a 1000 pounds per square inch pressure of which the pump is capable. That is to say, the valve 43 is held shut at a pressure within the compartment which is much less than the pressure exerted by the pump. As each stroke of the pump is negotiated, the pressure required to force open the valve 43 becomes higher by steps which are twenty times as great as the corresponding pressure steps within the compartment 1. With said 20 to 1 ratio, for example, the first stroke of the pump may induce 25 pounds per square inch in the compartment 1. This requires 500 pounds per square inch to open the valve 43 upon the next stroke. Since a man is capable of operating a pump of this class at 500 pounds per square inch, another stroke is thus made available and he may increase the pressure, within the compartment 1, to 50 pounds per square inch. Upon the next stroke this will require 1000 pounds per square inch in order to open the valve 43, and with the ordinary pump, this requires about all of the manual pressure which an operator can exert. In any event, if he can exert more pressure, the amount of each added pressure increment is twenty times that required for the next increment of pressure in the compartment 1. Thus, he soon reaches his maximum capacity for raising the pressure. The device will be seen to comprise means for making the size of the pressure increment required at the pump a large multiple of the pressure increment obtained in the compartment 1. It results not only in limiting the applied pressure but the amount of the lubricant charge.

If an automatic pump is used it will reach its cut-out pressure before that pressure is attained in the compartment 1. Thus, it may also be made to stop before blowing out a seal in compartment 1.

Figure 2:
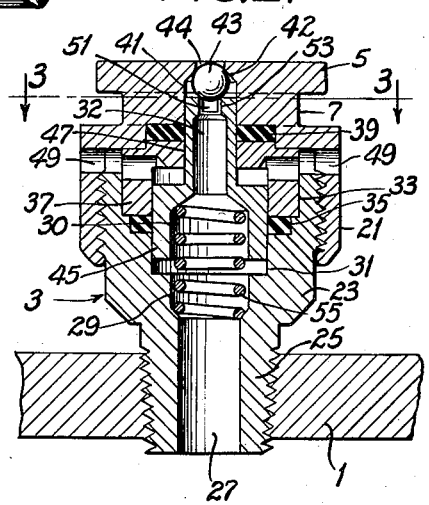
Fig. 2 is a view similar to Fig. 1, but showing only the fitting part in a closed position.

The operator requires no, or at most, few instructions, because he simply pumps until the resistance at the pump becomes so great that he cannot proceed further, after which he disconnects the coupling 9. The parts are then as shown in Fig. 2 wherein the valve 43 is closed under the effect of the low internal pressure in compartment 1. This pressure is maintained, provided the lubricant seals are in good condition, until the lubricant in the bearings is used up or escapes. As this occurs, the pressure in the compartment drops, so that when the coupling 9 is next applied a lower pump pressure is then sufficient to supply lubricant.

In Figs. 4–6 is shown another form of the invention, in which like numerals designate like parts. In this form the cap part 21 does not integrally carry the button head 5. This head 5 is carried upon a shank 56 which slides through the cap 21 and a packing 57. The packing 57 is held in place by a spring 59 which reacts against a piston head 61 of a member 63 which is threaded into the shank 56. Thus, the parts 5, 56, 63 and 61 move together, being normally pressed downward by means of the spring 59.

The piston head 61 has an extension 65 through an opening 67 in the body 23. On the other side of the opening 67 and on the stem 65 is a valve head 69 which seats upwardly in the opening 67 when the assembly of parts 56, 61 moves upward.

The parts 56, 61 are provided with connected passages 77, 77, 79 and 81 which transfer lubricant from the button head 5 to the interior of the body 23. A ball check-valve 73 normally is biased by a spring 75 to close off the inlet opening 77. This opening is only closed off against entry of dirt, a small milled slot 79 providing for communication of atmospheric pressure between opposite sides of the valve 73.

Operation of this second form is as follows:

The coupler 9 is attached to the button head 5. Pressure is engendered in the line 11 which passes out of the coupler 9 through the opening 77, opened valve 73, through openings 71, 79, 81 to a point within the body 23. At the first strokes, the parts being in the position shown in Fig. 5 permit the passage of lubricant to the opening 67 around the head 69 and to the chamber 1. Pressure is throttled down through the opening 77 and valve 73. As throttled (reduced) pressure builds up in the compartment 1 the pressure on piston 61 against spring 59 closes valve 69. Further pumping then simply increases pressure upon piston 61 which holds shut valve 69 and a pressure at the pump is quickly reached beyond which pump operation ceases.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A lubricant-receiving fitting comprising a hollow member providing an interior cylinder, means for attaching said hollow member to a lubricant-receiving compartment, means for attaching a coupling to the hollow member, said hollow member having an opening for receiving lubricant from the coupling, an opening communicating with said lubricant-receiving compartment, a piston in the cylinder, a valve in the passage between the coupler and said lubricant-receiving compartment, said piston being subject to pressure of fluid flowing from the fitting and adapted under said pressure to close said valve, and a portion associated with said piston which is subject to pressure of lubricant entering the fitting.

2. A lubricant-receiving fitting comprising a hollow member having an inlet and an outlet, means for attaching said member to a lubricant-receiving compartment so that the outlet communicates with said compartment, means for attachably receiving a coupler at said inlet, a differential cylinder in the fitting connecting the inlet and the outlet, and a differential piston in said differential cylinder having small and large sections, the large section of which is subjected to pressure at the outlet and the small section of which is subjected to pressure at the inlet, the valve seating outwardly in the inlet and being movable to closed position by said piston in response to outlet pressure.

3. A lubricant-receiving fitting comprising a hollow member having an inlet and an outlet, means for attaching said member to a lubricant-receiving compartment so that the outlet communicates with said compartment, means for attachably receiving a coupler at said inlet, a differential cylinder in the fitting connecting the inlet and the outlet, and a differential piston in said differential cylinder having small and large sections, the large section of which is subjected to pressure at the outlet and the small section of which is subjected to pressure at the inlet, the valve seating outwardly in the inlet and being movable to closed position by said piston in response to outlet pressure, said piston being hollow and transmitting lubricant from the inlet to the outlet.

4. A lubricant-receiving fitting comprising a hollow member having an inlet and an outlet, means for attaching said member to a lubricant-receiving compartment so that the outlet communicates with said compartment, means for attachably receiving a coupler at said inlet, a differential cylinder in the fitting connecting the inlet and the outlet, and a differential piston in said differential cylinder having small and large sections, the large section of which is subjected to pressure at the outlet and the small section of which is subjected to pressure at the inlet, the valve seating outwardly in the inlet and being movable to closed position by said piston in response to outlet pressure, said piston being hollow and transmitting lubricant from the inlet to the outlet, said hollow piston functioning as a pressure-reducing throttle.

5. A lubricant-receiving fitting comprising a hollow member having an inlet and an outlet, means for attaching said member to a lubricant-receiving compartment so that the outlet communicates with said compartment, means for attachably receiving a coupler at said inlet, a differential cylinder in the fitting connecting the inlet and the outlet, a differential piston in said differential cylinder having a small and a large portion, the large portion of which is subjected to pressure at the outlet and the small portion of which is subjected to pressure at the inlet, a valve seating outwardly in the inlet and being movable to closed position by said piston, and spring means normally biasing said differential piston to force the valve toward closed position.

6. A lubricant-receiving fitting comprising a hollow member having a passage therethrough constituting an inlet and an outlet, said passage also including a relatively large cylinder adjacent the outlet and a relatively small cylinder adjacent the inlet, differential piston means having a relatively large portion in said large cylinder and a relatively small portion in said small cylinder, and an outwardly closing check valve in the inlet operable to close by movement of the piston away from the outlet, said piston being hollow and transmitting lubricant from the inlet to the outlet, flow of lubricant through the piston being throttled thereby to reduce pressure whereby a relatively small pressure on the large area of the piston at the outlet is adapted to cause closing of the valve against a relatively larger pressure upon the small part of the piston from the inlet.

7. A lubricant-receiving fitting comprising a hollow member having an outlet, means for attaching said member to a lubricant-receiving compartment, a piston slidable in said hollow member, said piston having a portion extending outwardly from the hollow member, means on said outward portion for receiving a coupler, a cut-off valve operable by said movable piston member, said piston member being hollow and having an inlet and a communication therefrom to the interior of said hollow member, a check valve at the inlet, the effective area of said piston exposed to pressure being greater than the area which is exposed to pressure of said cut-off valve when closed whereby a relatively low pressure in said interior serves to cause said piston to close said cut-off valve, and means for biasing the piston toward a position to open said cut-off valve.

8. A lubricant-receiving fitting comprising a hollow member having an outlet, means for attaching said member to a lubricant-receiving compartment, a piston member slidable in said hollow member, said piston having a portion extending outwardly from the hollow member, means on said outward portion for receiving a coupler, a cut-off valve operable by said movable piston member, said piston member being hollow and having an inlet and communication therefrom to the interior of said hollow member, a check valve in the piston member at the inlet, the effective area of said piston exposed to pressure being greater than the area which is exposed to pressure of said cut-off valve when closed whereby a relatively low pressure in said interior serves to cause said piston to close said cut-off valve, and spring means for biasing the piston toward a position to open said cut-off valve.

9. A lubricant-receiving fitting comprising a hollow member providing an interior cylinder having an opening communicating with a lubricant-receiving compartment, means for attaching said hollow member to said lubricant-receiving compartment, means for attaching a coupling, said attaching means having an opening therethrough communicating with the cylinder, a hollow piston in the cylinder, a valve controlling flow through the piston and cylinder and movable in response to fluid pressure entering from the coupling, means associated with said piston supporting and moving the valve to open or close in direct proportion to piston movement, said piston having a face subject to pressure of fluid flowing out of the fitting, the piston being movable under said last-named pressure to close said valve, the piston being hollow and forming a conduit for lubricant.

LUTWIN C. ROTTER.
VICTOR G. KLEIN.